Nov. 3, 1942.  A. C. WILCOX  2,300,605
ELECTRIC FLOUR SIFTER
Filed Oct. 6, 1939
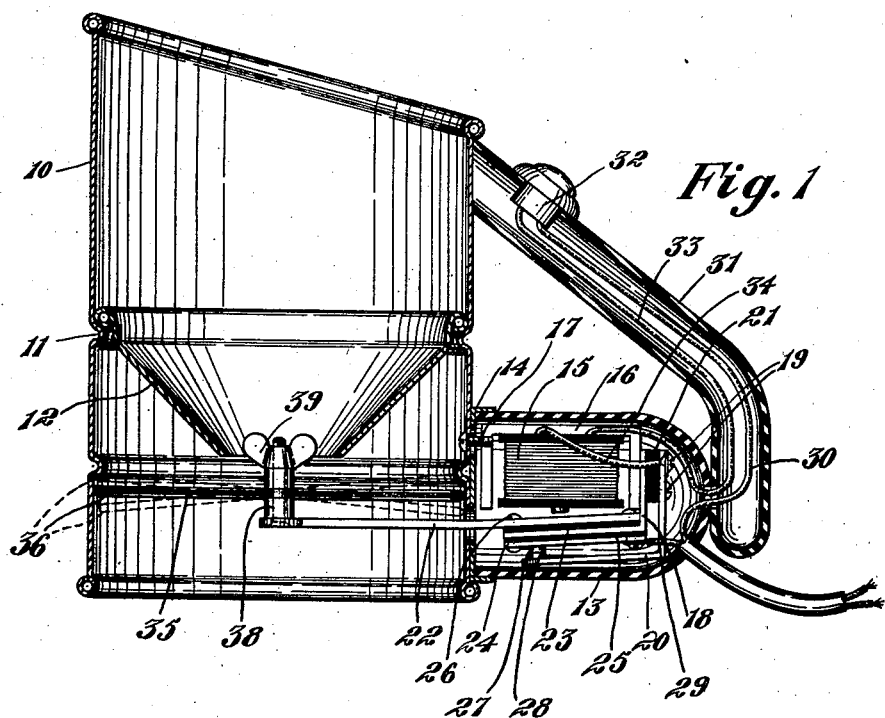
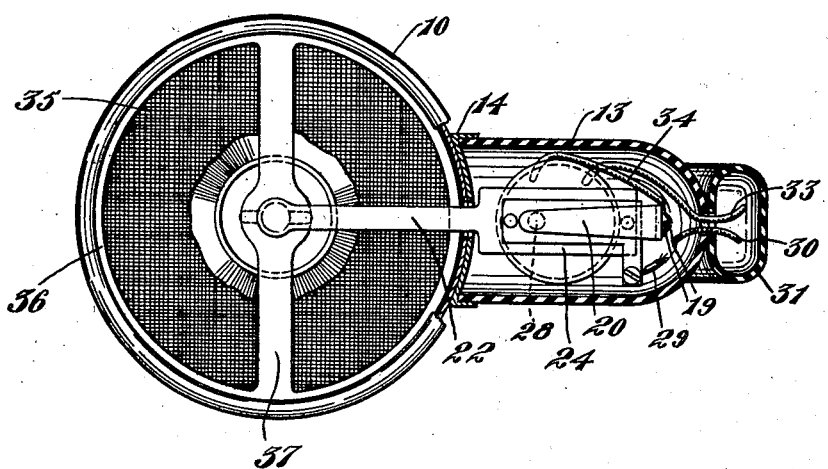
Fig. 2
Inventor
Albert C. Wilcox
By Frease and Bishop
Attorneys Patented Nov. 3, 1942

2,300,605

UNITED STATES PATENT OFFICE 2,300,605

ELECTRIC FLOUR SIFTER

Albert C. Wilcox, East Liverpool, Ohio

Application October 6, 1939, Serial No. 298,266

5 Claims. (Cl. 209—346)

The invention relates to flour sifters and more particularly to an electrically operated flour sifter.

The object of the invention is to provide a flour sifter having a flexibly mounted screen arranged to be vibrated so as to quickly sift the flour therethrough.

Another object is to provide a flour sifter of this character in which the screen is vibrated by the armature of a magnet provided with an electric make and break device whereby the screen may be rapidly and vigorously vibrated.

A further object is to provide such a flour sifter in which a funnel-shaped inner shell feeds the flour to the screen so as to relieve the screen of the bulk weight of the flour and thus not hamper the vibrating movement thereof.

A still further object of the improvement is to provide a flour sifter in which a grid is reciprocated across the top of the screen to sift the flour therethrough.

The above objects together with others which will be apparent from the drawing and following description may be attained by constructing the improved device in the manner illustrated in the accompanying drawing in which Figure 1 is a vertical sectional view through a flour sifter embodying the invention;

Fig. 2, a bottom plan sectional view of the improved flour sifter.

Similar numerals refer to similar parts throughout the several views.

Referring first to the form of the invention illustrated in Figures 1 and 2, the improved flour sifter to which the invention pertains includes a substantially cylindric vertical shell 10 having an internal annular rib 11 located at a point spaced from its lower end so as to support the funnel-shaped inner shell 12.

A housing 13 of Bakelite or other suitable insulation material may be diametrically attached to the lower portion of the outer shell 10 as by the flanged sheet 14 which may be spot welded or otherwise attached to the outside of said shell.

An electric magnet 15 is housed within the housing 13 one end thereof being connected to the U-shaped metal bar 16 which forms the pole pieces for the magnet and which may be connected to the outer shell as by the screw 17.

A substantially L-shaped flat spring 18 is connected to the metal bar 16 as by the screws 19 which also connect the substantially L-shaped brass strip 20, an insulation block 21 being interposed between the members 18 and 20.

A vibrating bar 22 of soft iron, forming the armature for the magnet, is connected to the L-shaped spring 18, a strip of insulation material 23 being interposed between the two members and a brass strip 24 is connected to the other side of the L-shaped spring 18 and insulated from the same as by a strip of insulation material 25, rivets 26 connecting the members 22 and 24 and the interposed insulation strips 23 and 25, respectively, to opposite sides of the L-shaped spring.

Contact points 27 and 28, of the make and break type, are formed upon the opposed sides of the brass strip 24 and the L-shaped brass strip 20, respectively, and adapted to cooperate as will be later described.

One lead wire 29 is connected to the brass strip 24 and another lead wire 30 is located within the hollow handle 31 and connected to the push button switch 32 and is then returned through the hollow handle as at 33 and connected to one side of the magnet 15, the wire 34 leading from the other side of the magnet to the L-shaped brass strip 20.

With this construction when the switch 32 is closed the circuit will be completed through the magnet 15 and contact points 27 and 28 energizing the magnet and pulling the vibrating bar 22 toward the magnet which breaks the circuit through 27 and 28 causing the L-shaped spring 18 to throw the bar 22 back to the position shown in Fig. 1 again completing the circuit through 27—28 and energizing the magnet so that this operation is continued rapidly.

The screen 35 is carried in a flexible frame 36 having the central cross-bar 37 by means of which it is connected to the free end of the bar 22, preferably spaced above said bar as by the boss or spacer 38.

A thumb nut 39 may be used for connecting the screen to the bar 22 and extends up into the mouth of the funnel 12 forming an agitator for loosening up the flour in the funnel and preventing the same from arching at the mouth of the funnel.

When the switch 32 is closed and the bar 22 vibrated as above described, the flexible screen frame 36 will not only be vibrated by a movement of the free end of the bar 22, but will be whipped back and forth between the dotted line positions shown in Figure 1 in order to facilitate the sifting of the flour through the screen.

It is known that attempts have been made to produce a flour sifter in which the screen is operated by a direct connected magnet without make and break points in which the vibrating bar is controlled entirely by the cycles in the circuit, which are so rapid that the throw of the vibrating bar is very short so that the operation of the sifter is unsatisfactory.

Cake flour such as is prepared and packed in boxes for this purpose is milled twenty-seven times finer than ordinary sack flour used for bread making, and owing to the extreme fineness of this cake flour short vibration tends to pack the flour on the screen instead of sifting it therethrough, this makes necessary a longer stroke that will throw the flour, and in addition to the long stroke a sudden stopping of the screen is necessary on the upward travel of the vibrating bar, and this is accomplished by permitting the vibrating bar to hit the pole piece. This sudden stop causes the flour to lift a trifle from the screen and separate itself, and then pass downward through the screen.

For this reason the funnel 12 is quite important as it carries the bulk weight of the flour permitting a small amount of the flour at a time to trickle down to the screen, which permits the action as above explained.

I claim:

1. A flour sifter including a shell open at its bottom, a magnet associated with the shell, a substantially horizontal vibrating bar arranged to vibrate in a vertical plane and arranged to be attracted by the magnet, said bar having a free end within the shell, a substantially horizontal screen in the lower portion of said shell, means connecting the center of the screen to the free end of the vibrating bar, said means constituting the sole support for said screen, an electric circuit for the magnet, and a make and break device in the circuit operated by the movement of the vibrating bar.

2. A flour sifter including a shell open at its bottom, a magnet associated with the shell, a substantially horizontal vibrating bar arranged to vibrate in a vertical plane and arranged to be attracted by the magnet, said bar having a free end within the shell, a substantially horizontal, flexible screen in the lower portion of said shell, a flexible peripheral frame upon the screen, means connecting the center of the screen to the free end of the vibrating bar, said means constituting the sole support for said screen, an electric circuit for the magnet, and a make and break device in the circuit operated by the movement of the vibrating bar.

3. A flour sifter including a shell open at its bottom, a substantially flat, horizontal screen located in the lower portion of the shell and bodily movable therein, a magnet at one side of the shell, a make-and-break device associated with the magnet, an armature for the magnet, means operatively connecting the armature to the center of the screen, said armature forming the sole support for the screen, and spring means for normally urging the screen downward and closing the make-and-break device to energize the magnet, the screen being moved upward and the make-and-break device being opened to de-energize the magnet by upward movement of the armature when the magnet is energized.

4. A flour sifter including a shell open at its lower end, a substantially flat, horizontal screen in the lower portion of the shell, a flexible, peripheral frame upon the shell, a magnet mounted upon the shell, a spring arm fixed at one end adjacent to the magnet, a vibrating bar mounted at one end upon the spring arm and forming an armature for the magnet, means mounting the central portion of the screen upon the free end of the vibrating bar, an electric circuit for the magnet, and a make-and-break device in said circuit, said make-and-break device comprising a fixed contact mounted adjacent to the spring arm and a movable contact carried by the spring arm and normally held in contact with the fixed contact.

5. A flour sifter including a shell open at its lower end, a substantially flat, horizontal screen in the lower portion of the shell, a flexible, peripheral frame upon the shell, a magnet mounted upon the shell, a spring arm fixed at one end adjacent to the magnet, a vibrating bar mounted at one end upon the spring arm and forming an armature for the magnet, means mounting the central portion of the screen upon the free end of the vibrating bar, a normally open electric circuit for the magnet, and a make-and-break device in said circuit, said make-and-break device comprising a fixed contact mounted adjacent to the spring arm and a movable contact carried by the spring arm and normally held in contact with the fixed contact, a handle upon the shell and a switch upon the handle for closing the electric circuit.

ALBERT C. WILCOX.